Patented May 16, 1950

2,507,691

UNITED STATES PATENT OFFICE 2,507,691

ACID-RESISTANT ENAMELS

William W. Coffeen, Union, and Ralph R. Danielson, Elizabeth, N. J., assignors to Metal & Thermit Corporation, New York, N. Y., a corporation of New Jersey No Drawing. Application July 8, 1948,
Serial No. 37,518

3 Claims. (Cl. 106—49)

This invention relates to vitreous enamels for application to ferrous metals such as cast iron, and particularly to enamels having the properties of acid resistance and high opacity. One of the principal objects of the invention is to provide enamels of the acid resistant type having improved opacity over commercial enamels of the same class, the improvement being such as to enable the thickness of the enamel coating to be reduced, if desired, over that ordinarily employed without loss of quality.

Broadly speaking, the invention involves an enamel or enamel frit of the lead-alkali metalborosilicate type in which barium may or may not be present. Within the class or type of enamels as thus defined, the invention provides an enamel frit having a balanced composition, resulting in an improvement of the opacity, acid resistance, and gloss properties of the enamel. The frit is further characterized by the presence of molybdenum oxide, usually calculated as the trioxide, as an opacifier, and the invention, therefore, comprises a frit of balanced composition incorporating molybdenum trioxide as an opacifier.

Qualitatively, the frit comprises the following components: silica $SiO_2$, titania $TiO_2$, boron trioxide $B_2O_3$, alkali metal oxide $R_2O$, such as sodium oxide $Na_2O$, lead oxide $PbO$, fluorine $F$, molybdenum trioxide $MoO_3$, and an oxide of a metal of group II of the periodic table, RO, selected from the class of oxides consisting of calcium oxide CaO, barium oxide BaO, and zinc oxide ZnO. More specifically, the invention comprises an opaque, acid resistant enamel frit comprising essentially the following components, based on the oxide or melted composition of the frit, in amounts defined by the following concentrations, the latter being in terms of parts by weight:

| | |
|---|---|
| $SiO_2$ | 30 to 50 |
| $TiO_2$ | 2 to 15 | the sum of the foregoing two ingredients always being in the range of 35 to 55,

| | |
|---|---|
| $B_2O_3$ | 3 to 10 |
| $Na_2O$ | 6 to 20 |
| $PbO$ | 6 to 20 |
| $F$ | 1 to 8 |
| $MoO_3$ | 2 to 8 |
| $RO$ | 4 to 15 | in which RO is an oxide selected from the class consisting of Ca, Ba, and Zn oxides and which may comprise any two or all three of these oxides. Alkali metal oxides such as potassium oxide $K_2O$ and lithium oxide $Li_2O$ may replace the sodium oxide in whole or in part. In general, an improved opacity is favored if the F exceeds 2.5 when the PbO exceeds 10.

Each of the foregoing ingredients may be supplied from a variety of sources. For example, in preparing the batch for making the frit, sodium oxide may be introduced thereto as borax, sodium nitrate, sodium carbonate, sodium silicate, feldspar, etc.; calcium oxide as calcium fluoride, calcium carbonate, etc.; boron oxide as borax, either hydrated or not, boric acid, colemanite, razorite, etc.; silica as flint, feldspar, sodium silicate, etc.; titanium dioxide as rutile, titanium hydrate, alkali metal titanates, etc.; zinc oxide as itself and its carbonate, etc.; lead oxide as white lead, red lead, lead silicate, litharge, etc.; fluorine as sodium fluoride, sodium silico fluoride, calcium fluoride; barium as barium carbonate, barium nitrate, barium oxide, barium hydroxide, barium fluoride, etc.; molybdenum trioxide as itself, molybdenum dioxide, molybdenum sesquioxide, and as the molybdates of zinc, barium, calcium, lead, sodium, etc.

The following examples may serve to illustrate the invention.

Example 1

A smelter batch composed of the following materials was made:

| | Grams |
|---|---|
| Flint | 668 |
| Titanium dioxide | 146 |
| Borax | 306 |
| Soda nitre | 75 |
| Soda ash | 159 |
| Sodium silico fluoride | 60 |
| Zinc oxide | 24 |
| Calcium carbonate | 134 |
| Litharge | 150 |
| Lithium carbonate | 37 |
| Zinc molybdate | 141 |

This batch was mixed thoroughly, smelted to a clear glass in a crucible furnace at a temperature of about 1950° F. for a period of approximately one hour, and quenched in water. The quenched glass or frit was dried and then dry ground to a fineness such that about 95% passed a 100 mesh screen. The frit had substantially the following oxide composition in terms of parts by weight:

| | |
|---|---|
| $SiO_2$ | 43.7 |
| $TiO_2$ | 9.2 |
| $B_2O_3$ | 7.1 |
| $R_2O$: | |
|    $Na_2O$ | 11.9 |
|    $Li_2O$ | 1.0 |
| PbO | 9.5 |
| F | 2.3 |
| $MoO_3$ | 5.7 |
| RO: | |
|    ZnO | 4.8 |
|    CaO | 4.8 |

A cast iron sample plate was cleaned by sandblasting and sprayed with an ordinary dry-process ground coat enamel or "slush" coat. The slush coat was dried, the plate weighed and then placed in a gas-fired muffle furnace at 1600° F. for 8 minutes to allow the iron to be thoroughly heated. The plate was removed and placed on one pan of a balance and the enamel powder dusted on the plate evenly through a vibrating screen until 30 gms. (corresponding to a coating of 180 gms. per sq. ft.) had been applied. The plate was then returned to the furnace for a period of 1 minute, removed, and the dusting repeated, making a total thickness of coating of 360 gms. per sq. ft. The plate was then fired for 1 minute and allowed to cool. The acid resistance and opacity of this enamel were measured and compared with that of a commercial enamel employing sodium antimonate, a standard opacifier. The latter enamel was applied to an identical plate in the manner just described. The following results were obtained:

| | Reflectance | | |
|---|---|---|---|
| | Blue | Green | Amber |
| Example 1 | 82 | 85 | 85 |
| Commercial | 79 | 82 | 82 |

Both of the foregoing enamels had grade AA acid resistance.

Other enamel frits prepared according to the invention are as follows:

| Example No. | 2 | 3 | 4 | 5 | 6 | 7 | 8 | 9 |
|---|---|---|---|---|---|---|---|---|
| $SiO_2$ | 43.8 | 44.2 | 40.3 | 47.4 | 43.5 | 36.1 | 47.3 | 47.3 |
| $TiO_2$ | 9.2 | 9.3 | 5.4 | 5.4 | 9.3 | 9.9 | 5.8 | 5.8 |
| $B_2O_3$ | 7.1 | 7.2 | 9.9 | 7.2 | 7.2 | 5.9 | 7.7 | 7.7 |
| $R_2O$: | | | | | | | | |
|   $Na_2O$ | 12.9 | 12.0 | 12.7 | 12.9 | 12.9 | 13.5 | 9.8 | 14.0 |
|   $Li_2O$ | | 1.0 | | | | | | |
| PbO | 9.5 | 9.6 | 15.1 | 9.5 | 9.5 | 19.1 | 10.3 | 6.1 |
| F | 2.3 | 2.3 | 2.9 | 2.3 | 2.3 | 3.8 | 2.5 | 2.5 |
| $MoO_3$ | 5.7 | 4.8 | 5.7 | 5.7 | 5.7 | 5.6 | 6.2 | 6.2 |
| RO: | | | | | | | | |
|   ZnO | 2.8 | 4.8 | 1.9 | 4.8 | 4.8 | 1.0 | 5.2 | 5.2 |
|   CaO | 6.7 | 4.8 | 6.1 | 4.8 | 4.8 | 5.1 | 5.2 | 5.2 |
| Acid Resistance | AA | AA | AA | A | AA | A | AA | A |
| Reflectance (green) | 85 | 82 | 82 | 87 | 85 | 78 | 82 | 84 |

The acid resistance tests were carried out according to the procedure described in "Test for Acid Resistance of Porcelain Enamels," Part I—Flatware, pages 4–6, April, 1940, Porcelain Enamel Institute, Inc. The reflectance data were obtained with a standard Hunter multi-purpose reflectometer according to the standard reflectance test of the Porcelain Standards Section, Porcelain Enamel Institute, Inc., revised August, 1944. While the enamel frits in the above examples were applied by the dry process, they may also be applied, in appropriate cases, by the wet process by wet milling the frits with the usual mill additions to form enamel slips and applying the slips by spraying or dipping. Conventional temperatures and times of application for the wet or dry process may be employed.

In the light of the foregoing description, the following is claimed:

1. An opaque, acid resistant enamel frit consisting essentially of the following components, based on the melted composition of the frit, in amounts defined by the following concentrations, the latter being in terms of parts by weight:

| | |
|---|---|
| $SiO_2$ | 30 to 50 |
| $TiO_2$ | 2 to 15 | the sum of the foregoing two ingredients always being in the range of 35 to 55,

| | |
|---|---|
| $B_2O_3$ | 3 to 10 |
| $R_2O$ | 6 to 20 | in which $R_2O$ is an alkali metal oxide selected from the class consisting of Na, K, and Li oxides,

| | |
|---|---|
| PbO | 6 to 20 |
| F | 1 to 8 | the F exceeding 2.5 when the PbO exceeds 10.

| | |
|---|---|
| $MoO_3$ | 2 to 8 |
| RO | 4 to 15 | in which RO is an oxide selected from the class consisting of CaO, BaO, and ZnO.

2. An opaque, acid resistant enamel frit consisting essentially of the following components, based on the melted composition of the frit, in amounts defined by the following concentrations, the latter being in terms of parts by weight:

| | |
|---|---|
| $SiO_2$ | 30 to 50 |
| $TiO_2$ | 2 to 15 | the sum of the foregoing two ingredients always being in the range of 35 to 55,

| | |
|---|---|
| $B_2O_3$ | 3 to 10 |
| $Na_2O$ | 6 to 20 |
| PbO | 6 to 20 |
| F | 1 to 8 | the F exceedings 2.5 when the PbO exceeds 10,

| | |
|---|---|
| $MoO_3$ | 2 to 8 |
| RO | 4 to 15 | in which RO is an oxide selected from the class consisting of CaO, BaO, and ZnO.

3. An acid resistant enamel frit having substantially the following composition, all amounts being in terms of parts by weight:

| | |
|---|---|
| $SiO_2$ | 43.7 |
| $TiO_2$ | 9.2 |
| $B_2O_3$ | 7.1 |
| $Na_2O$ | 11.9 |
| $Li_2O$ | 1.0 |
| PbO | 9.5 |
| F | 2.3 |
| $MoO_3$ | 5.7 |
| ZnO | 4.8 |
| CaO | 4.8 |

WILLIAM W. COFFEEN.
RALPH R. DANIELSON.

REFERENCES CITED

The following references are of record in the file of this patent:

UNITED STATES PATENTS

| Number | Name | Date |
|---|---|---|
| 2,245,541 | Goodwin | June 10, 1941 |
| 2,294,760 | Morris | Sept. 1, 1942 |